Oct. 8, 1940.  H. K. WEIHE  2,217,461
HYDRAULIC BRAKE APPARATUS
Filed Dec. 16, 1937  2 Sheets-Sheet 1
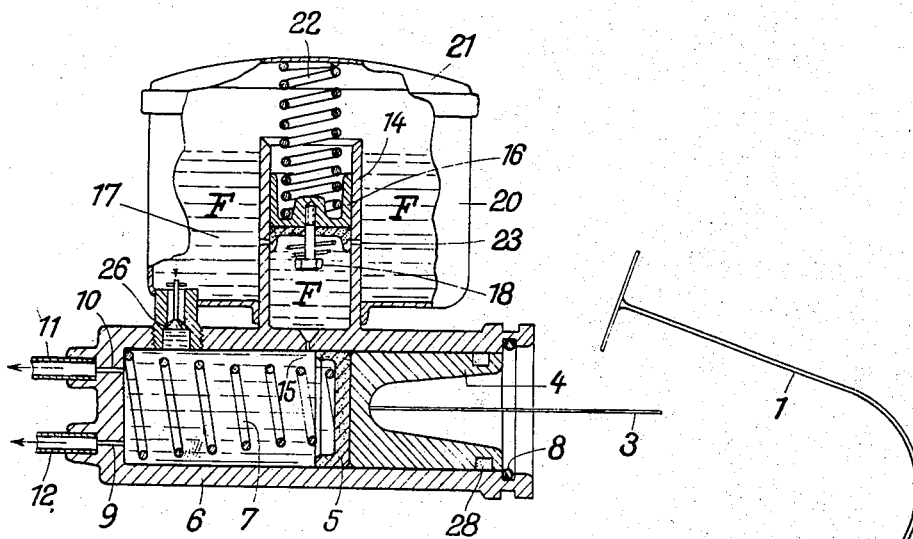
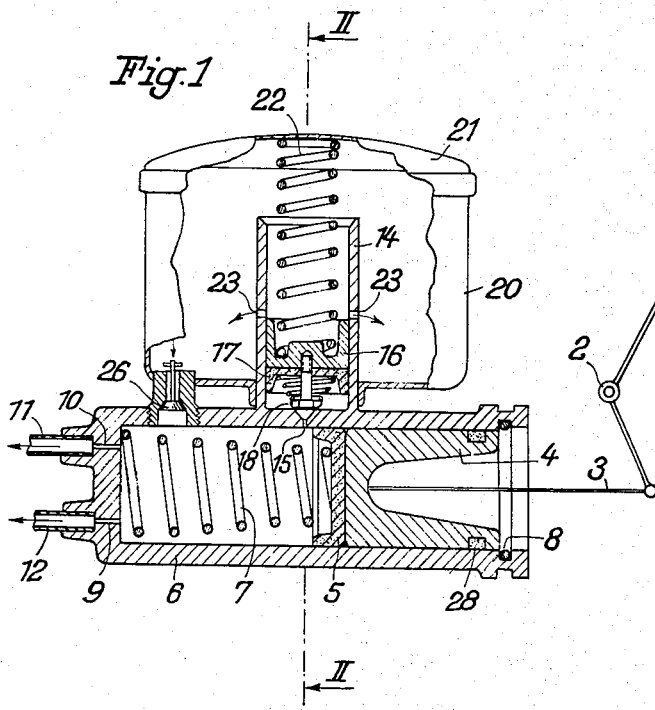
Inventor:
HERMANN KURT WEIHE
By:
Richards & Geier
Attorneys Oct. 8, 1940.  H. K. WEIHE  2,217,461
HYDRAULIC BRAKE APPARATUS
Filed Dec. 16, 1937  2 Sheets-Sheet 2
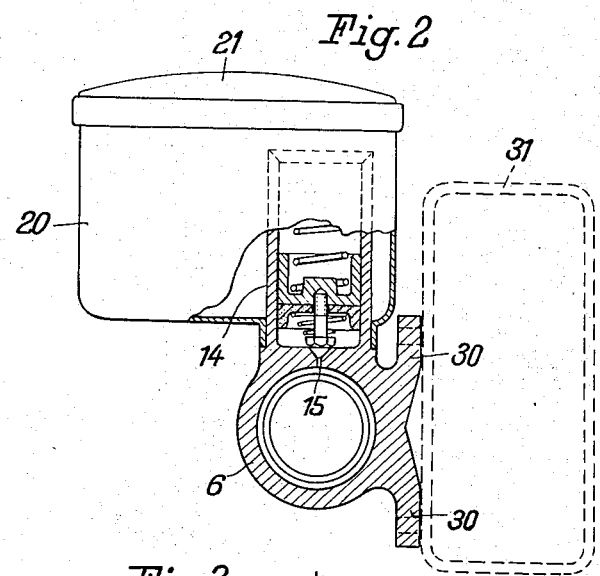
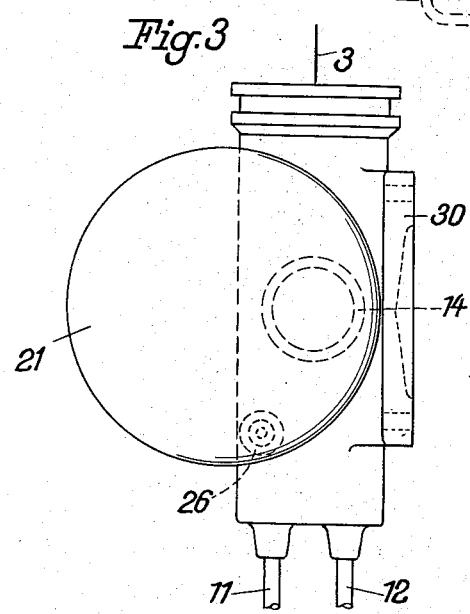
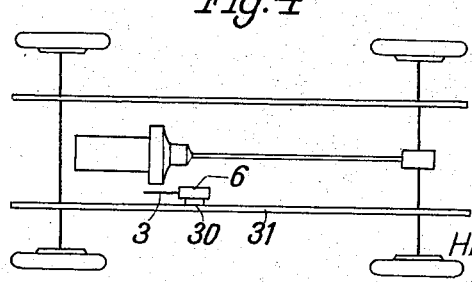
Inventor:
HERMANN KURT WEIHE
By:
Richards & Geier
Attorneys:

UNITED STATES PATENT OFFICE 2,217,461

HYDRAULIC BRAKE APPARATUS

Hermann Kurt Weihe, Chemnitz, Germany

Application December 16, 1937, Serial No. 180,083
In Germany December 19, 1936

5 Claims. (Cl. 60—54.6)

This invention relates to an improved hydraulic brake apparatus.

Hydraulic brake mechanism as now constructed incorporates a cylinder having a piston therein associated with operating mechanism. To distinguish this part of the hydraulic apparatus by means of which the pressure in the hydraulic system is generated from the cylinders and pistons to be found in the brake drums which respond to the pressure produced by the operation of the aforesaid apparatus it is customary to refer to the cylinder as the master cylinder.

As is well known the presence of air in a hydraulic brake system is very detrimental due to its compressibility thereby rendering the brakes virtually inoperative.

The invention has for its primary object to provide an improved master cylinder for actuating a hydraulic brake system which will automatically charge the said system including said master cylinder with an excess of hydraulic fluid and will continue to maintain the fluid in said system under a predetermined pressure above atmospheric pressure after the associated brake actuating mechanism has returned to its initial position.

It is another object of the invention to maintain the pressure in the said hydraulic system external of the master cylinder above atmospheric pressure at all times so as to prevent ingress of air due to the formation of a partial vacuum at any point in the said system owing for example to changes in atmospheric temperature and pressure effecting a change in volume or a leak at any point where a drop in pressure occurs.

Another object of the invention is to provide an automatically recharging pressure reservoir for maintaining the pressure in said hydraulic system.

A further object of the invention is to provide automatic release in said pressure reservoir to prevent overcharging and generation of excessive pressure.

It is also a further general object of the present invention to provide a master cylinder for hydraulic brake system which is simple and inexpensive in its construction, light in weight and small in dimensions, particularly suitable for medium and small automobiles and which may be easily and quickly applied to existing hydraulic systems without extensive alterations and without necessitating the exercise of any special care or skill upon the part of the workman.

With the above and other objects in view the invention consists in the improved master cylinder and in the form of construction and relative arrangement of the several parts and in the manner of associating said master cylinder in the hydraulic brake system as will hereinafter by way of example be more fully described and illustrated in the accompanying drawings.

In the drawings wherein one embodiment of the invention has been illustrated and in which the same reference characters designate corresponding parts throughout the several views:

Fig. 1 is a diagrammatic part sectional elevation of the master cylinder before the introduction of fluid therein;

Fig. 1a is a similar elevation of the master cylinder with fluid introduced therein and the plunger in the auxiliary chamber in the normal working position;

Fig. 2 is a part section on the line II—II of Fig. 1;

Fig. 3 is a plan view of the master cylinder; and

Fig. 4 diagrammatically illustrates a simple way of securing the master cylinder to a longitudinal frame member of a motor vehicle.

The reference I denotes a brake operating pedal pivotally mounted on a shaft 2. The lower end of the brake pedal I is pivotally connected to a piston rod 3 actuating a piston 4 together with the cup washer 5 both reciprocable in a main cylinder 6 against the action of a compression spring 7. The piston 4 when in its initial position of rest abuts with its skirt against a stop in the form of an annulus 8 mounted in an internal annular recess at the bottom of the main cylinder 6. The head of the main cylinder 6 is provided or formed with fluid outlets 9 and 10 to which are connected the hydraulic brake pipe lines 11 and 12 of the hydraulic brake system communicating with the brake drum actuating cylinders on the vehicle wheels (not shown). The fluid outlets 9 and 10 are of restricted section relatively to the section of the pipe lines 11 and 12.

The main cylinder 6 is provided with a small lateral compensating port 15 in the well-known manner hereinafter referred to as the passage. This passage 15 is so positioned with respect to the length of the main cylinder 6 that it is open and not covered by the cup washer 5 when the piston 4 is in its initial position of rest as shown in Fig. 1. The passage 15 communicates with a pressure reservoir formed by an auxiliary chamber 14 in which a plunger 16 with a cup washer 17 is reciprocably mounted, the plunger 16 being loaded by a compression spring 22. The downward movement of the plunger 16 is limited by a stop formed for example by the head of a screw 18 screwed in the head of the plunger 16 and serving at the same time to retain the spring holding the cup washer 17. The auxiliary chamber 14 is mounted within a fluid reservoir 20 which it will be expedient to manufacture from sheet metal. The fluid reservoir 20 is closed by a lid 21 with a bayonet connection but so as not to exclude air. The lid 21 has the compression spring 22 loading the plunger 16 abutting against it. The compression spring 22 also secures the lid 21 against accidentally becoming detached. The auxiliary chamber 14 is provided with several lateral overflow ports 23 all in the same plane and controlled by the plunger 16. The overflow ports 23 are only open if and when the pressure in the hydraulic brake system exceeds a certain predetermined value. The brake fluid F operating the hydraulic brake system and refilling same in the event of changes in the volume of the fluid in the system is contained in the fluid reservoir 20 and also in the auxiliary chamber 14. A refilling port 26 is provided in the main cylinder 6 adjacent the fluid outlets 9 and 10 therein, said refilling port communicating with the main cylinder 6 and being controlled by a gravity-loaded valve uni-directionally operating to admit fluid into the main cylinder. The area of the effective aperture of the refilling port 26 relative to the total area of the effective apertures of the fluid outlets 9 and 10 is selected so that on the return movement of the piston 4 in the main cylinder 6 after completion of the braking action a considerably greater quantity of fluid is introduced into the main cylinder from the fluid reservoir 20 than the quantity of fluid flowing back from the narrow hydraulic lines under the action of the springs usually associated with the brake drums, a partial vacuum being temporarily formed thereby in the main cylinder 6 above the piston head. The subsequent return of the brake fluid from the lines of the brake system then results in an excess of fluid being urged into the main cylinder 6, such excess being automatically transferred into the auxiliary chamber 14. Practical experiments have shown that it is expedient for the ratio between the area of the refilling port 26 and the total area of the fluid outlets 9 and 10 to be such that the ratio between the quantity of fluid introduced through the refilling port 26 and that flowing back into the main cylinder 6 from the brake lines 11 and 12 on the return movement of the piston 4 is approximately 15:1.

In order to provide an efficacious seal between the space above the cylinder head and the rear of the piston a rubber sealing washer 28 is disposed in an annular groove in the piston skirt.

As shown in Figs. 2 to 4 the main cylinder 6 is formed with a lateral flange 30 by means of which the aggregate of main cylinder fluid reservoir and auxiliary chamber (hereinafter referred to as the master cylinder) is secured to the chassis of the vehicle. It will be seen therefore that with the master cylinder according to the present invention no separate securing device need be provided, the master cylinder being directly connected to the longitudinal frame member 31 of the vehicle chassis. For this purpose the auxiliary chamber 14 is eccentrically arranged in the fluid reservoir 20 whereby securing the master cylinder to the longitudinal chassis frame member 31 by means of the lateral flange 30 is facilitated. It will be obvious that without departing from the scope of the invention the master cylinder may be provided with flanges on the head thereof for securing to the chassis and that the auxiliary chamber 14 may be centrally disposed within the pressure reservoir 20.

The operation of the master cylinder above described is as follows:

To put the hydraulic brake system in order for operation the whole system is first filled with a suitable fluid which is poured into the fluid reservoir 20, the lid 21 being removed for this purpose. By oscillating the operating pedal 1 in the manner of a pump, fluid is gradually pumped into the main cylinder 6 through the refilling port 26 and is urged by repeated depressions of the brake pedal 1 into the pipe lines 11, 12 through the outlets 9, 10 whence it enters the various brake-actuating cylinders in the brake drums associated with the wheels of the vehicle. This operation is repeated until the whole hydraulic brake system is evacuated from air and, after closing all air escape ports in the system, all parts of the system are completely filled with hydraulic fluid, the desired pressure above atmospheric pressure which will prevent the ingress of atmospheric air into the system being then obtained. As a result of this operation the auxiliary chamber 14 serving as a pressure reservoir has also been automatically filled with excess fluid from the main cylinder 6 through the passage 15 the plunger 16 being lifted until it reaches the position shown in Fig. 1a thereby compressing the spring 22. Describing now in detail the filling of the auxiliary chamber 14, this is effected by fluid continuing to be introduced into the main cylinder 6 through the refilling port 26 by repeated operation of the brake pedal 1 even after the pipe lines 11 and 12 and the rest of the hydraulic brake system is completely filled with fluid. This is possible by a partial vacuum being temporarily formed in the main cylinder 6 owing to the return movement of the fluid in the system being impeded by the restrictions in the outlets 9 and 10. When under the action of the springs usually associated with the brake drums the fluid from the brake system returns into the main cylinder 6 the excess of fluid thus created in the main cylinder is urged into the auxiliary chamber 14 through the passage 15 as soon as the latter has been opened by the piston 4 returning into its initial position of rest. This operation is repeated until the spring-loaded plunger 16 in the auxiliary chamber 14 is in the position shown in Fig. 1a whereupon any further excess fluid is returned into the fluid reservoir 20 through the overflow ports 23.

The fluid thus stored under pressure in the auxiliary chamber 14 is then available for automatically compensating for any subsequent decrease in the volume of fluid in the brake system whilst the brake is not being applied. The provision of the overflow ports 23 also enables any increase in the volume of fluid in the brake system to be compensated for which may be due to other reasons such as increased temperature. The pressure in the auxiliary chamber 14, which is always above atmospheric pressure, can therefore not exceed a certain predetermined value corresponding to the strength of the compression spring 22, and any desired maximum pressure may be selected by suitably dimensioning the strength of the spring 22.

The refilling port 26, which is normally closed by its valve being pressed onto its seat by the pressure in the brake system, also remains closed during the braking stroke of the piston 4. The additional pressure produced in the main cylinder 6 by the braking stroke of the piston 4 presses the valve in the refilling port 26 firmly on its seat so as to form a perfect seal thereby preventing any loss of the braking pressure. The refilling port 26 only opens when the pressure in the main cylinder 6 is below atmospheric pressure on the return movement of the piston 4 into its initial position of rest after completion of the braking operation and under the sucking action created thereby.

The auxiliary chamber 14 communicating with the main cylinder 6 through the passage 15 ensures that the necessary pressure above atmospheric pressure is maintained at all times in the main cylinder 6, the pipe lines 11, 12 and the rest of the hydraulic brake system including the brake operating cylinders associated with the brake drums on the wheels whereby the formation of partial vacua anywhere in the brake system and due to any reason is effectively prevented thus preventing any atmospheric air being sucked in, even if an appreciable contraction of the brake fluid within the brake system takes place owing to the occurrence of very low temperatures. This is particularly important in regard to parts of the brake system which are disposed above the fluid level in the fluid reservoir such as the brake drum actuating cylinders and the bends in the pipe lines. The master cylinder according to the present invention therefore ensures that at all times a powerful and effective brake is available which means increased security in congested traffic and while driving at high speeds.

Finally the brake apparatus according to the present invention enables the hydraulic brake to be operated by means of a fluid the viscosity of which varies greatly with varying temperatures. As is well known the hydraulic brakes now-a-days on the market are operated with a special fluid the viscosity of which is constant for the temperatures occurring in practice. Such a special fluid is however very expensive owing to its peculiar composition and therefore increases the cost of maintenance of the hydraulic brake. By means of the hydraulic brake apparatus forming the subject of this invention the undesirable effects of any change in the viscosity of the brake fluid detrimentally affecting the required pressure in the system are immediately compensated for owing to the provision of the automatically refilling pressure reservoir formed by the auxiliary chamber 14 which for example enables mineral oil to be used in the brake system.

It is to be understood however that other means may be provided for maintaining the fluid in said system under pressure within the scope of the invention as the foregoing example is given by way of explanation of the invention and not by way of limitation.

What I claim and desire to secure by Letters Patent is:

1. A hydraulic brake device comprising a master cylinder, a pressure piston reciprocable therein, a fluid container, means constituting a conduit between said cylinder and said container, a refilling valve situated within said conduit and opening it during the return movement of said piston, means forming an auxiliary chamber having openings formed therein connecting said chamber with the interior of said container, means constituting a compensating passage between said auxiliary chamber and said cylinder, said passage being separate and distinct from said conduit and remaining free in the original inoperative position of said piston, and resilient pressure means in said chamber, the superfluous fluid being sucked through said refilling valve and automatically filling said auxiliary chamber after the completion of the pressure action of said piston, said resilient pressure means freeing said openings when pressure in said auxiliary chamber reaches a predetermined amount to cause a flow of a part of the fluid from the auxiliary chamber to said fluid container.

2. A hydraulic brake device comprising a master cylinder, a pressure piston reciprocable therein, a fluid container, means constituting a conduit between said cylinder and said container, a refilling valve situated within said conduit and opening it during the return movement of said piston, an auxiliary cylinder connected with said master cylinder and situated within said container and having openings formed therein connecting the interior of the auxiliary cylinder with the interior of said container, said master cylinder having a compensating passage formed therein which interconnects the interiors of the two cylinders, said passage being separate and distinct from said conduit and remaining free in the original inoperative position of said piston, a movable auxiliary piston within said auxiliary cylinder, and a spring pressing against said auxiliary piston, the superfluous fluid being sucked through said refilling valve and automatically filling said auxiliary cylinder after the completion of the pressure action of said piston, said spring freeing said openings when pressure in said auxiliary cylinder reaches a predetermined amount to cause a flow of a part of the fluid from the auxiliary cylinder to said fluid container.

3. A hydraulic brake device comprising a reciprocable pressure piston, a fluid container, means forming an auxiliary cylinder and an overflow port connecting the interior of said auxiliary cylinder with the interior of said fluid container, means forming a master cylinder enclosing said piston and a compensating passage between said auxiliary cylinder and said master cylinder, said passage remaining free in the original inoperative position of said piston, means constituting a conduit between said master cylinder and said container, a refilling valve situated within said conduit and opening it during the return movement of said piston, said compensating passage being separate and distinct from said conduit, the superfluous fluid being sucked through said refilling valve and automatically filling said auxiliary cylinder after the completion of the pressure action of said piston, and resilient pressure means in said auxiliary cylinder for freeing said overflow port when pressure in said auxiliary cylinder reaches a predetermined amount to cause a flow of a part of the fluid from the auxiliary cylinder to said fluid container.

4. A hydraulic brake device, comprising a master cylinder, a pressure piston reciprocable therein, a fluid container, means constituting a conduit between said cylinder and said container, a refilling valve situated within said conduit and opening it during the return movement of said piston, means forming an auxiliary chamber situated within said container and having openings formed therein connecting said chamber with the interior of said container, means constituting a compensating passage between said auxiliary chamber and said cylinder, said passage being separate and distinct from said conduit and remaining free in the original inoperative position of said piston, and resilient pressure means in said chamber, the superfluous fluid being sucked through said refilling valve and automatically filling said auxiliary chamber after the completion of the pressure action of said piston, said resilient pressure means freeing said openings when pressure in said auxiliary chamber reaches a predetermined amount to cause a flow of a part of the fluid from the auxiliary chamber to said fluid container.

5. A hydraulic brake device, comprising a master cylinder, a pipe line connected with said master cylinder, a pressure piston reciprocable therein, a fluid container, means forming an auxiliary chamber situated within said container and having openings formed therein connecting said chamber with the interior of said cylinder, means constituting a compensating passage between said auxiliary chamber and said cylinder, said passage remaining free in the original inoperative position of said piston, resilient pressure means in said chamber, and means constituting a conduit between said cylinder and said container, said conduit being separate and distinct from said passage, a refilling valve situated within said conduit and having a cross-sectional flow area permitting a substantially larger amount of fluid to be sucked through said refilling valve, than the amount of fluid flowing back from said pipe line into said master cylinder during the return stroke of said pressure piston, said resilient pressure means freeing said openings when pressure in said auxiliary chamber reaches a predetermined amount to cause a flow of a part of the fluid from the auxiliary chamber to said fluid container.

HERMANN KURT WEIHE.